US012079885B2

(12) United States Patent
Tayeb et al.

(10) Patent No.: US 12,079,885 B2
(45) Date of Patent: Sep. 3, 2024

(54) INFLUENCER SEGMENTATION DETECTOR (71) Applicant: Intuit Inc., Mountain View, CA (US)

(72) Inventors: Yaakov Tayeb, Petah Tikva (IL); Daniel Vaisman, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/855,532

(22) Filed: Jun. 30, 2022

(65) Prior Publication Data

US 2024/0005413 A1 Jan. 4, 2024

(51) Int. Cl.
G06Q 50/00 (2024.01)
G06N 20/00 (2019.01)

(52) U.S. Cl.
CPC ............ G06Q 50/01 (2013.01); G06N 20/00 (2019.01)

(58) Field of Classification Search
CPC ............................... G06Q 50/01; G06N 20/00
See application file for complete search history.

(56) References Cited

U.S. PATENT DOCUMENTS

| 11,436,291 | B1 * | 9/2022 | Tayeb | G06F 16/9536 |
| 2012/0150631 | A1 * | 6/2012 | Root | G06Q 30/0251 715/753 |
| 2013/0132158 | A1 * | 5/2013 | L'Huillier | G06Q 30/0201 705/7.29 |
| 2015/0317564 | A1 * | 11/2015 | Chen | G06N 5/02 706/46 |
| 2019/0012746 | A1 * | 1/2019 | Sullivan | G06Q 30/02 |
| 2019/0311418 | A1 * | 10/2019 | Pandit | G06Q 50/01 |

FOREIGN PATENT DOCUMENTS

WO   WO-2018118982 A1 * 6/2018

OTHER PUBLICATIONS

Francalanci, Chiara, and Ajaz Hussain. "Discovering social influencers with network visualization: evidence from the tourism domain." Information Technology & Tourism 16.1 (2016): 103-125. (Year: 2016).*
De Salve, Andrea, et al. "Predicting influential users in online social network groups." ACM Transactions on Knowledge Discovery from Data (TKDD) 15.3 (2021): 1-50. (Year: 2021).*
Brin, S. et al., "The Anatomy of a Large Scale Hypertextual Web Search Engine", Computer Networks and ISDN Systems, vol. 30, Issues 1-7, Apr. 1998 (20 pages).
Imagency.com: Guest User (2020; "Our Award-winning Campaign for HelloFresh", Accessed Apr. 20, 2021 (2 pages). https://imagency.com/news/influencer-marketing-awards-2020-winner-hellofresh.

(Continued)

*Primary Examiner* — Brendan S O'Shea
(74) *Attorney, Agent, or Firm* — Lathrop GPM LLP (57) ABSTRACT A method implements influencer segmentation detection. The method includes selecting transaction data for a time window and processing the transaction data for the time window to generate a graph for the time window. The method further includes extracting, from the graph, a feature set for a node of the graph for the time window and processing the feature set to generate a predicted rank for the node for a subsequent time window using a machine learning model. The method further includes selecting, using the predicted rank, an entity identifier corresponding to the node and presenting the entity identifier.

14 Claims, 7 Drawing Sheets

(56) References Cited

OTHER PUBLICATIONS

Rogers, E. M. et al., "Methods of Measuring Opinion Leadership", Public Opinion Quarterly, vol. 3, No. 26, Autumn, 1962, pp. 435-441 (7 pages).

Nandi, M. "Identifying Negative Influencers in Mobile Customer Churn"; (Stanford University) Verizon Wireless, Dec. 10, 2014 (7 pages).

* cited by examiner

| INFLUENCE 463 | ENTITY NAME 465 | LEVEL 467 |
|---|---|---|
| "2.8" 469 | "ALICE" 471 | "1" 473 |
| "1.7" 475 | "JOE" 477 | "2" 479 |
| "0.1" 481 | "BIZCO" 483 | "3" 485 |

*FIGURE 4C*

MESSAGE A 492

ALICE! GET FREE ACCESS TO THE SERVICE WITH THIS LINK!

MESSAGE B 495

JOE! GET DISCOUNTED ACCESS TO THE SERVICE WITH THIS LINK!

MESSAGE C 498

BIZCO! GET ACCESS TO THE SERVICE WITH THIS LINK!

INFLUENCER SEGMENTATION DETECTOR

BACKGROUND

Influencers have the power to affect the habits or quantifiable actions of others. For example, social media influencers may upload original content, which may be sponsored, to social media platforms to influence the followers of the influencers.

Several tools may be used to generate analytics about influencers to determine whether an individual or entity is or is not an influencer. A challenge is predicting which individuals and entities will become influencers.

SUMMARY

In general, in one or more aspects, the disclosure relates to a method that implements influencer segmentation detection. The method includes selecting transaction data for a time window and processing the transaction data for the time window to generate a graph for the time window. The method further includes extracting, from the graph, a feature set for a node of the graph for the time window and processing the feature set to generate a predicted rank for the node for a subsequent time window using a machine learning model. The method further includes selecting, using the predicted rank, an entity identifier corresponding to the node and presenting the entity identifier.

In general, in one or more aspects, the disclosure relates to a system that implements influencer segmentation detection. The system includes a graph controller configured to generate a graph, an extraction controller configured to extract a feature set, a machine learning model configured to generate a predicted rank, a selection controller configured to select an entity identifier, and an application executing on one or more servers. The application is configured for selecting transaction data for a time window and processing, by the graph controller, the transaction data for the time window to generate a graph for the time window. The application is further configured for extracting, by the extraction controller from the graph, a feature set for a node of the graph for the time window and processing, by the machine learning model, the feature set to generate a predicted rank for the node for a subsequent time window. The application is further configured for selecting, by the selection controller using the predicted rank, an entity identifier corresponding to the node and presenting the entity identifier.

In general, in one or more aspects, the disclosure relates to a method that uses influencer segmentation detection. The method includes transmitting a request and displaying entity identifiers received in a response to the request. The entity identifiers are sorted using predicted ranks, which are generated by: selecting transaction data for a time window; processing the transaction data for the time window to generate a graph for the time window; extracting, from the graph, a feature set for a node of the graph for the time window; processing the feature set to generate a predicted rank for the node for a subsequent time window using a machine learning model; and sorting the predicted ranks to generate a sorted list corresponding to the entity identifiers.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement an influencer segmentation detector and predicts which individuals or entities will become influencers before the individuals or entities have become influencers. The detection is performed by a system that detects (i.e., calculates) and predicts the ranks of different influencers (i.e., entities) based on transaction data for certain segments (i.e., windows) of time. The system sorts the entities by the predicted ranks and may transmit messages to the entities. For example, highly ranked entities with large influence may be given exclusive access to services and lower ranked entities with less influence may be invited to try the services. Concentrating such messages to entities with more influence can steer these larger influencers to using and promoting the services without wasting resources on promoting the same services to entities with less influence.

The system determines ranks of entities (i.e., determines levels of influence) by splitting up transaction data into time windows that are analyzed over a time period. The analysis involves generating a graph from the transaction data with nodes of the graph representing entities and edges of the graph generated from the transactions between the entities. After creating the graph, a feature set (i.e., a set of features) is extracted for each node of the graph for each time window. The feature set is input to a machine learning model (e.g., a recurrent neural network) that generates the predicted rank for the node for the next time window. The predicted ranks may then be sorted to cluster the entities based on the predicted ranks for the entities.

The machine learning model is trained to predict the rank (i.e., level of influence) of a node (i.e., of an entity) for the next time window from the feature set for a current time window. During training, the rank for a node may be calculated from the graph for the time window. The rank calculated from the graph for the current time window may be compared with the predicted rank generated for the previous time window with the machine learning model. The difference between the predicted and calculated values are used to update the machine learning model.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of machine learning for influence metrics and measurement. The various elements, systems, components, and steps shown in the figures may be omitted, repeated, combined, and/or altered as shown from the figures. Accordingly, the scope of the present disclosure should not be considered limited to the specific arrangements shown in the figures.

Figure 1:
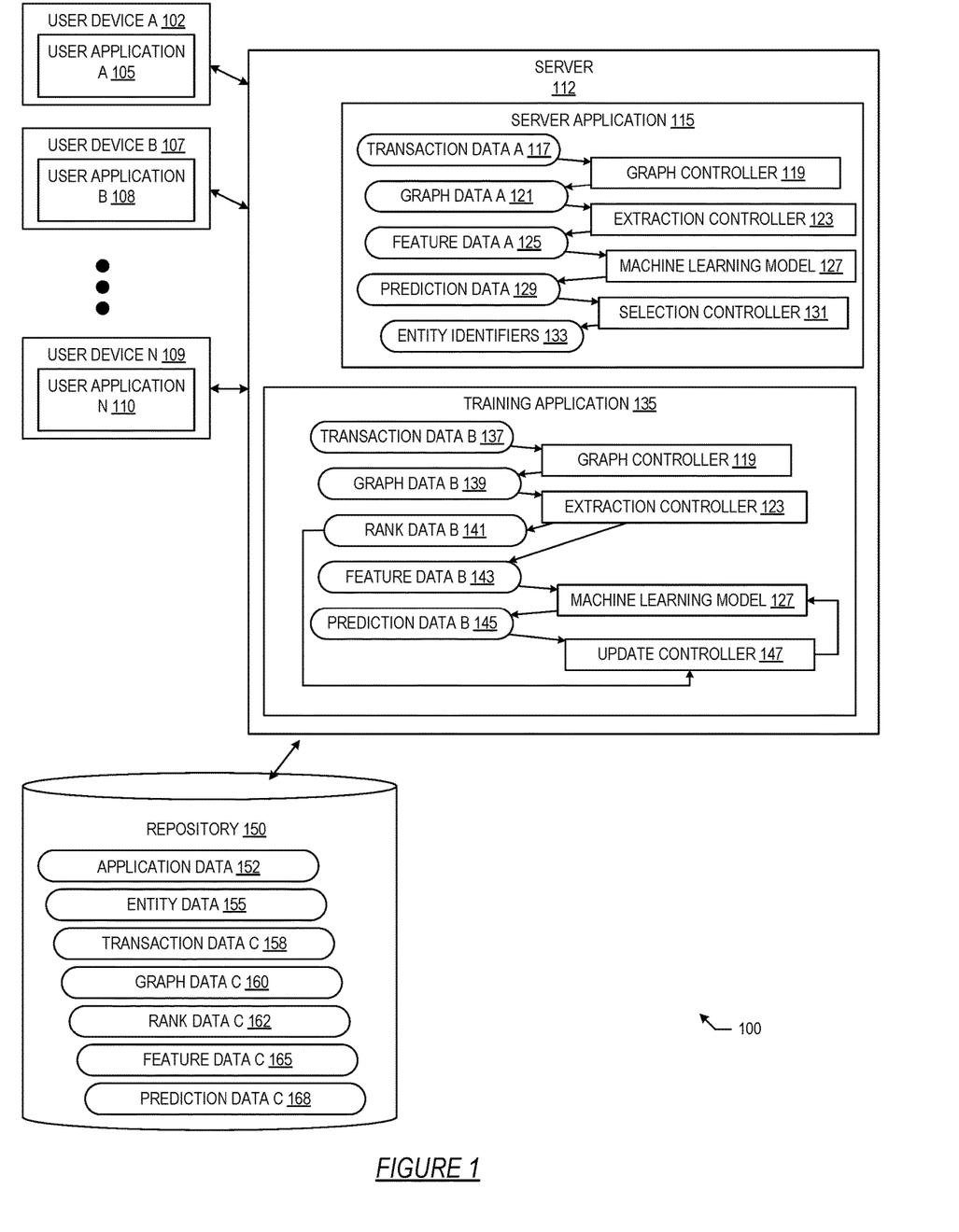
FIG. 1 and FIG. 2 show diagrams of systems in accordance with disclosed embodiments.

Turning to FIG. 1, the system (100) implements an influencer segmentation detector with the server application. The system (100) selects the entity identifiers (133) based on an analysis of the transaction data A (117) to identify the predicted ranks of entities. The system (100) may display the sorted entities sorted by the predicted ranks and may transmit messages to users operating the user devices A (102) and B (107) through N (109). The system (100) includes the user devices A (102) and B (107) through N (109), the server (112), and the repository (150).

Figure 5A:
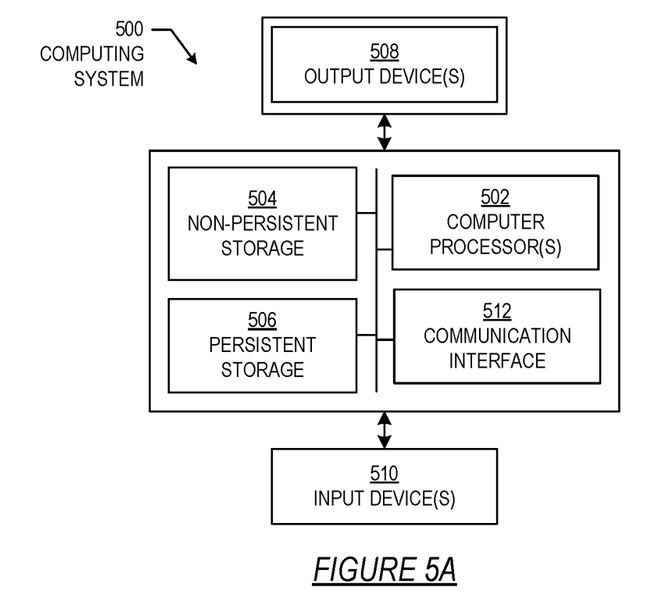
FIG. 5A and FIG. 5B show computing systems in accordance with disclosed embodiments.

The server (112) is a computing system (further described in relation to FIG. 5A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115) and the training application (135).

The server application (115) is a collection of programs that may execute on multiple servers of a cloud environment, including the server (112). The server application (115) processes the transaction data A (117) to select the entity identifiers (133) using the graph controller (119), the extraction controller (123), the machine learning model (127), and the selection controller (131). Processing of the transaction data A (117) to select the entity identifiers (133) may be in response to requests from the user devices A (102) and B (107) through N (109). The server application (115) may host websites, accessed by users of the user devices A (102) and B (107) through N (109), that receive requests and provide responses. The responses may include the entity identifiers (133). The websites hosted by the server application (115) may serve structured documents (hypertext markup language (HTML) pages, extensible markup language (XML) pages, JavaScript object notation (JSON) files and messages, etc.). The server application (115) includes the graph controller (119), the extraction controller (123), the machine learning model (127), and the selection controller (131).

The transaction data A (117) is a subset of the transaction data C (158) of the repository (150). The transaction data A (117) includes information about transactions (e.g., entity identifiers, values, types, etc.) recorded between entities during a time window. The transaction data A (117) is used by the graph controller (119) to generate the graph data A (121).

The graph controller (119) is a set of hardware and software components that may operate as part of the server application (112). The graph controller (119) processes the transaction data A (117) to generate the graph data A (121). The graph controller (119) maps the entities from the transactions to the nodes of the graphs of the graph data A (121). The graph controller (119) generates the edges of the graphs of the graph data A (121) from the transaction amounts of the transactions of the transaction data A (117). Different graphs may be generated for transactions of different types.

The graph data A (121) is a set of graphs generated by the graph controller (119) from the transaction data A (117). The graphs of the graph data A (121) include nodes and edges based on the transactions from the transaction data A (117). Different graphs may be generated for different time windows being analyzed by the server application (115).

The extraction controller (123) is a set of hardware and software components that may operate as part of the server application (112). The extraction controller (123) processes the graph data A (121) to extract the feature data A (125). The extraction controller (123) may use multiple algorithms to process the graph data A (121) and generate the feature data A (125).

The feature data A (125) includes the features extracted from the graphs of the graph data A (121). The features are organized into feature sets with one feature set corresponding to one graph. The features include attribute features and topological features. The attribute features for a node may include the averages of the values of the transactions of neighboring nodes, an identification of the industry classification of neighboring nodes, frequency of transactions, the probabilistic expectation of a transaction during a unit of time (e.g., the probability that a transaction will occur per day), etc. The topological features for a node describe the structure of surrounding nodes and edges and may include the number of neighboring nodes, the number of nodes within a threshold amount of edges, the number of indegree edges of a node, the number of outdegree edges of a node, the number of nodes for which a path exists to a node, the strength of connectivity between nodes, normalized values of the edges of a node, similarity scores between nodes, etc. For example, a similarity score may identify the number of topological features that are the same between different nodes, may be the dot product of vectors of the features of two nodes, may be a cosine similarity between two nodes, may be the Euclidean distance between the vectors of the features of two nodes, etc.

The machine learning model (127) is a set of hardware and software components that may operate as part of the server application (112). The machine learning model (127) process the feature data A (125) to generate the prediction data (129). In one embodiment, the machine learning model (127) may include one or more artificial neural networks with one or more layers. For example, the machine learning model (127) may include a recurrent neural network, a long short term memory (LSTM), a gated recurrent unit (GRU), a transformer neural network, a fully connected network, etc.

The prediction data A (129) is generated by the machine learning model (127) from the feature data A (125). In one embodiment, the prediction data (129) includes a prediction rank calculated from a feature set (of the feature data A (125)) extracted from a graph (of the graph data A (121)) generated from the transaction data A (117). In one embodiment, the prediction rank is a measure of the predicted influence of an entity corresponding to a node from a graph generated from transaction data. The prediction data A (129) identifies predicted values of data for a subsequent time window based on the feature data A (125), which includes data for a present time window and may include data or calculations based on past time windows.

The selection controller (131) is a set of hardware and software components that may operate as part of the server application (112). The selection controller (131) processes the prediction data (129) to generate the entity identifiers (133). In one embodiment, the selection controller (131) sorts a list of entity identifiers based on the prediction data (129) that corresponds to the entities of the entity identifiers (133). The list of the entity identifiers (133) may be presented to the user devices A (102) and B (107) through N (109).

The entity identifiers (133) are identifiers for the entities identified in the transactions of the transaction data A (117). The entity identifiers (133) may be sorted and selected based on the prediction data (129).

The training application (135) is a collection of programs that may execute on multiple servers of a cloud environment, including the server (112). The training application (135) trains the machine learning model (127) using the update controller (147). In one embodiment, the training application (135) may use the graph controller (119) and the extraction controller (123).

In one embodiment, the graph controller (119) and the extraction controller (123) are invoked by the training application (135). The graph controller (119) processes the transaction data B (137) to generate the graph data B (139). The extraction controller (123) processes the graph data B (139) to generate the rank data B (141) and the feature data B (143).

The machine learning model (127) is trained by the training application (135). The machine learning model (127) processes the feature data B (143) to generate the prediction data B (145) and is updated by the update controller (147).

The transaction data B (137) this is a subset of the transaction data at C (158) that is used by the training application (135) to train the machine learning model (127). The transaction data B (137) includes data describing historical transactions that curve during previous time windows.

The graph data B (139) is a set of graphs generated by the graph controller (119) from the transaction data B (137). The graph data B (139) is a subset of the graph data C (160) used for training the machine learning model (127).

The rank data B (141) is a set of ranks generated by the extraction control of (123) from the graph data B (139). The rank data B (141) is a subset of the rank data C (162) used for training the machine learning model (127).

The feature data B (143) includes the features extracted from the graphs of the graph data B (139). The feature data B (143) is a subset of the feature data C (165) used for training the machine learning model (127).

The prediction data B (145) is generated by the machine learning model (127) from the feature data B (143). The prediction data B (145) is a subset of the prediction data C (168) used for training the machine learning model (127).

The update controller (147) is a set of hardware and software components that may operate as part of the server application (112). The update controller (147) processes the rank data B (141) and the prediction data B (145) to update the machine learning model (127). In one embodiment, the update controller (147) may use backpropagation to compare the rank data B (141) with the prediction data B (145) and generate the updates for the machine learning model (127).

The user devices A (102) and B (107) through N (109) are computing systems (further described in FIG. 5A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view information, including the information stored in the repository (150) and processed by the server application (115) and the training application (135). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112). In one embodiment, the user applications A (105) and B (108) through N (110) provide graphical user interfaces that display information stored in the repository (150).

As an example, the user application A (105) be used by a user to request a list of entities sorted by level of influence. The levels of influence of entities may be identified by the predicted ranks of the corresponding nodes from the graph data A (121). A list of entities sorted by the prediction ranks may be received and displayed by the user application A (105) to an operator of the user device A (120).

As another example, the user device N (109) may be used by a developer to maintain the software application (115) hosted by the server (112). Developers may view the nodes and edges of the graphs from the graph data C (160) and make updates to the application data (152), the entity data (155), the transaction data C (158), the graph data C (160), the rank data C (162), the feature data C (165), and the prediction data C (168) to correct errors or modify the application served to the users of the system (100).

The repository (150) is a computing system that may include multiple computing devices in accordance with the computing system (500) and the nodes (522) and (524) described below in FIGS. 5A and 5B. The repository (150) may be hosted by a cloud services provider that also hosts the server (112). The cloud services provider may provide hosting, virtualization, and data storage services as well as other cloud services and to operate and control the data, programs, and applications that store and retrieve data from the repository (150). The data in the repository (150) includes the application data (152), the entity data (155), the transaction data C (158), the graph data C (160), the rank data C (162), the feature data C (165), and the prediction data C (168).

The application data (152) includes information that is accessed by users of the system (100). The application data (152) may include the source code files of an application (e.g., HTML files).

The entity data (155) includes information that describes the entities of transactions from the transaction data C (158). The entities may be identified with identifiers that are unique to each entity. Entities may be individual persons, organizations, businesses, etc. The entity data (155) may include the identifiers as well as contact information, demographic information, geographic information, etc. The contact information may include names, addresses (physical and electronic), phone numbers, etc., of entities. The demographic information may include socioeconomic information including employment status, education, income, marriage status, etc. The geographic information may identify one or more locations that correspond to entities, including home addresses, business addresses, geographical regions, franchise locations and names, etc.

The transaction data C (158) is data that describes transactions. The transactions may be described in electronic records that identify the entities of transactions and describe the exchanges of the transactions. In one embodiment, a transaction is a payment transaction between two entities transferring a payment amount between financial accounts of the entities.

The graph data C (160) is data that describes the graphs generated by the system (100). Multiple graphs may be generated from the transaction data C (158) and stored to the graph data C (160). Different graphs may be generated for different time windows and for different transaction types. Different types of transactions include transactions that are made using mobile payments, credit cards, cash, etc. In one embodiment, a graph may be generated for transactions that use mobile payments of a first mobile payment provider (e.g., Apple Pay®) and a different graph may be generated for transactions that use mobile payments of a different mobile payment provider (e.g., Android Pay®). Apple Pay® is a mobile payment system and is registered to Apple Inc., One Apple Park Way, Cupertino, CALIFORNIA 95014. Android Pay® is a mobile payment system and is registered to GOOGLE LLC, 1600 AMPHITHEATRE PARKWAY, MOUNTAIN VIEW, CALIFORNIA 94043.

The rank data C (162) is data generated from the graph data C (160). The rank data C (162) ranks the nodes (and corresponding entities) from the graph data C (160). In one embodiment, a ranking algorithm is used to determine the rank of a node based on the number of edges connected to the node.

The feature data C (165) is data generated from the graph data C (160). The feature data C (165) includes feature sets (sets of features) for transactions from the transaction data C (158) that occur during a time window.

The prediction data C (168) is data generated from the feature data C (165). In one embodiment, the prediction data C (168) predicts the values for ranks of nodes from the graphs in the graph data C (160) for future time windows.

Although shown using distributed computing architectures and systems, other architectures and systems may be used. In one embodiment, the server application (115) may be part of a monolithic application that implements experiment result networks. In one embodiment, the user applications A (105) and B (108) through N (110) may be part of a monolithic applications that implement experiment result networks without the server application (115).

Figure 2:
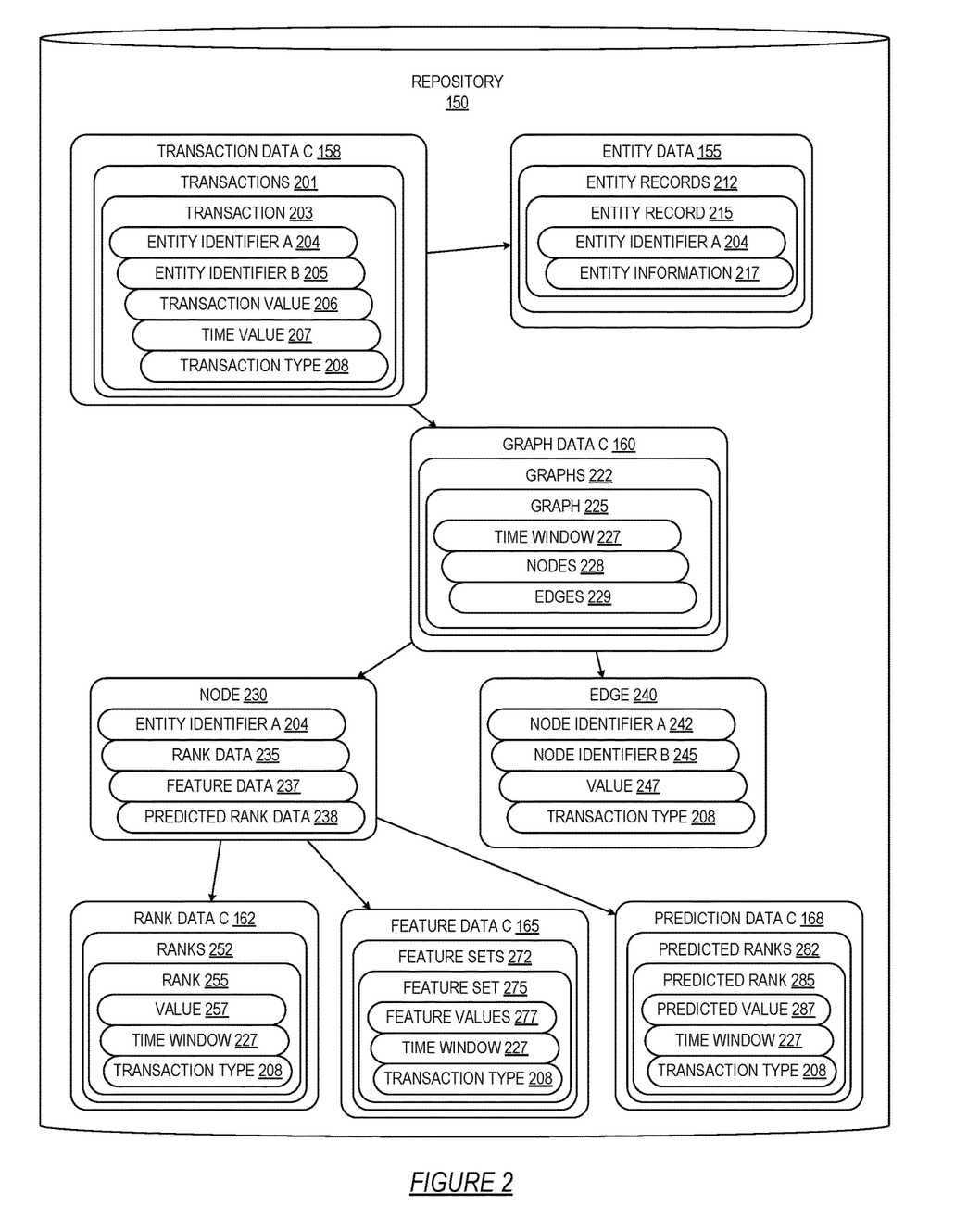

Turning to FIG. 2, the repository (150) stores data used and maintained by the system (100) of FIG. 1. The repository (150) may include multiple physical devices that store the data.

The transaction data C (158) includes data describing the transactions (201), which include the transaction (203). The transaction (203) includes the entity identifier A (204), the entity identifier B (205), the transaction value (206), the time value (207), and the transaction type (208). The transaction data C (158) is the basis from which the entity data (155) and the graph data C (160) are generated.

The entity identifier A (204) and the entity identifier B (205) identify entities described in the entity data (155). For example, the entity identifier A (204) identifies the entity corresponding to the entity record (215). In one embodiment, the entity identifier A (204) corresponds to a payor of the transaction (203) and the entity identifier B (205) corresponds to a payee of the transaction (203).

The transaction value (206) is an amount transferred between accounts of the entities identified with the entity identifiers A (204) and B (205). In one embodiment, the transaction value (206) identifies a payment amount.

The time value (207) is a value that identifies a time for the transaction (203). For example, the time value (207) may be a timestamp that identifies the date and time that the transaction (203) was executed.

The transaction type (208) identifies the type of the transaction (203). Different types of transactions include transactions that are made using mobile payments, credit cards, cash, etc.

Different types of transactions may be analyzed by the system. In one embodiment, a transaction may be the transmission of data from a source to a destination. In one embodiment, a transaction may be a payment between a source entity and a destination entity.

The structured text below (formatted in accordance with JSON) provides an example of a payment transaction between an individual and a business.

```
{
    "Source": "Thomas A. Anderson",
    "Destination": "Bizco",
    "Amount": "28.92",
    "Timestamp": "Wed May 18 2022 07:28:35 GMT-0500 (Central
    Daylight Time)",
    "Type": "mobile_payment"
}
```

The structured text below (formatted in accordance with JSON) provides an example of a transaction transferring data over a satellite network between two computing systems (referred to as clusters) using a UNIX timestamp.

```
{
    "Source": "US East Coast Cluster",
    "Destination": "Europe Cluster",
    "Amount": "130 GB",
    "Timestamp": "1652749688",
    "Type": "satellite_transmission"
}
```

The entity data (155) is data, stored in the repository (150), that describes entities identified by the system. The entity data (155) includes the entity records (212), which include the entity record (215).

The entity record (215) is a record of data that corresponds to an entity. The entity record (215) includes the entity identifier A (204) and the entity information (217). The entity identifier A (204) is a unique value to an entity to distinguish one entity from other entities. The entity information (217) includes information about a specific entity. The entity information (217) may include contact information, demographic information, etc.

The graph data C (160) is data, stored in the repository (150), that describes the graphs (222), which are generated from the transactions (201) of the transaction data C (158). The graph data C (160) includes the graphs (222), which include the graph (225).

The graph (225) is generated for the time window (227) and includes the nodes (228) and the edges (229). The time window (227) identifies a window of time for the graph (225) that may be used to filter the time values the transaction was (201). For example, the time value (207) of the transaction (203) may fall within the time window (227). The graph (225) includes the nodes (228) and the edges (229). The nodes (228) may be unique to the graph (225) and may identify one or more of the same entities that are identified by other nodes from other graphs of the graph data C (160). The edges (229) may be unique to the graph (225).

The node (230) is one of the nodes (228) of the graph (225). The node (230) includes the entity identifier A (204), the rank data (235), the feature data (237), and the predicted rank data (238) period. The entity identifier A (204) identifies the entity corresponding to the entity record (215) as the entity for the node (230). The rank data (235) identifies a rank for the node (230). The feature data (237) includes the feature set extracted for the node (230) from the graph (225) period the predicted rank data (238) is the predicted rank of the node (230) that is generated from processing the feature data (237).

The edge (240) is one of the edges (229) of the graph (225). The edge (240) includes the node identifiers A (242) and B (245) that each identify one of the nodes (228) for the edge (240). For example, the node identifier A (242) may identify the node (230).

The value (247) is the value of the edge (240). In one embodiment, the value (247) of the edge (240) is an aggregation of the transaction values between the nodes identified by the node identifiers A (242) and B (245). In one embodiment, the edge (240) is a directed edge that aggregates values transferred from a first node (identified with the node identifier A (242)) to a second node (identified with the node identifier B (245)) but not from the second node to the first node (for which a different edge may be included in the graph (225)).

The transaction type (208) is the type of transaction upon which the value (247) of the edge (240) may be based. For example, the edge (240) may have the value (247) being an aggregation of payments may with a specific mobile platform (e.g., Apple Pay® transactions) from a first node to a second node. The edge (240) may be an aggregation of multiple transaction types, which may not include one or more specific transaction types. For example, the edge (240) may include types of transactions except for transactions made with a specific payment method or system (e.g., cash transactions, check transactions, credit card transactions, Android Pay® transactions, etc., but not Apple Pay® transactions).

The rank data (162) is stored in the repository (150) and includes the ranks (252) for the nodes of the graphs generated from the transactions (201). The ranks (252) include the rank (255). The rank (255) includes the value (257) and is for the time window (227) and the transaction type (208).

In one embodiment, the value (257) of the rank (255) is generated in accordance with Equation 1. Equation 1 uses a subset of outdegree values and a subset of outdegree edges. Different equations may be used. The initial rank for each node may be 1, may be 1/n (where n is the number of nodes in the graph), an aggregation of transaction values (e.g., the sum outdegree edge values, the sum of indegree edge values, etc.).

$$R(A) = \frac{R(S_1)}{C(S_1)} + \ldots + \frac{R(S_n)}{C(S_n)} \qquad \text{Eq. 1}$$

In Equation 1, the function R(A) is the rank of node "A". The function C(S1) is an outdegree count of node "S1". In one embodiment, each edge value is normalized to "1" and the outdegree count is a simple count of the number of outdegree edges from a node. In one embodiment, each edge value is weighted based on the transaction values and the outdegree count is proportional to the weight of an edge with respect to the sum of the outdegree edge values of a node. For example, if a node "S1" has three outdegree edges with values of "12.43", "59.27", and "176.88", then the function C(S1) for the node may return the value of "248.58".

Multiple iterations may be performed. The iterations may continue until a criterion is satisfied, e.g., when the sum of the changes of the ranks is below a value of a change threshold.

The feature data C (165) is stored in the repository (150) and includes the feature sets (272). The feature sets (272) include the feature set (275). The feature set (275) is generated from the graph (225). The feature set (275) includes the feature values (277) extracted from the graph (225). The feature set (275) corresponds to the time window (227) and the transaction type (208).

The feature values are values for features that may include attribute features and topological features. The attribute features may include the averages of the values of the transactions of neighboring nodes, an identification of the industry classification of neighboring nodes, frequency of transactions, the probabilistic expectation of a transaction during a unit of time (e.g., the probability that a transaction will occur per day), etc. The topological features for a node describe the structure of surrounding nodes and edges and may include the number of neighboring nodes, the number of nodes within a threshold amount of edges, the number of indegree edges of a node, the number of outdegree edges of a node, the number of nodes for which a path exists to a node, the strength of connectivity between nodes, normalized values of the edges of a node, similarity scores between nodes, etc. For example, a similarity score may identify the number of topological features that are the same between different nodes, may be the dot product of vectors of the features of two nodes, may be a cosine similarity between vectors of the features of two nodes, may be the Euclidean distance between the vectors of the features of two nodes, etc.

The prediction data C (168) is stored in the repository (150) and includes the predicted ranks (282). The predicted ranks (282) include the predicted rank (285). The predicted rank (285) is the rank predicted from the feature set (275) from the graph (225). The predicted rank (285) has the predicted value (287), is predicted using the date from the time window (227) and is for the transaction type (208). The predicted rank (285) is calculated from the feature set (275) for the time window (227) and predicts the value of a rank for a subsequent time window. For example, with a daily time window, a feature set for a Wednesday may be used to generate the rank predicted for the Thursday time window (i.e., the Thursday predicted rank).

Figure 3:
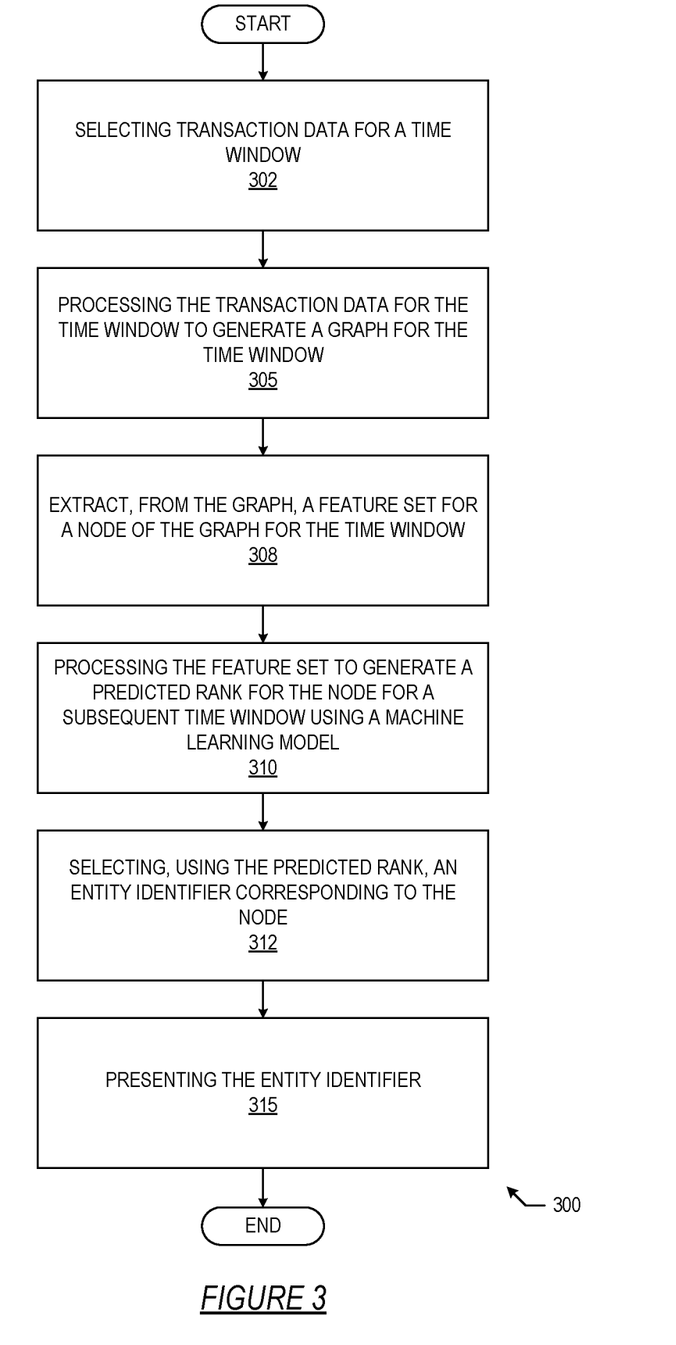
FIG. 3 shows a flowchart in accordance with disclosed embodiments.

Turning to FIG. 3, the process (300) implements an influencer segmentation detector. The process (300) may be performed by a server.

At Step 302, transaction data for a time window is selected. The time window may include a start time and an end time. Transactions with time values between the start time and the end time of the time window may be selected. The time window may be hourly, daily, weekly, monthly, quarterly, yearly, etc.

At Step 305, the transaction data is processed for the time window to generate a graph for the time window. The graph may be generated by mapping entities from the transactions to nodes of the graphs and mapping transactions to edges. In one embodiment, an edge between two nodes may have a value that is a sum of multiple transactions between the entities represented by the nodes.

At Step 308, the graph is processed to extract a feature set for a node of the graph for the time window. The feature set includes a set of one or more features, which may include attribute features and topological features.

At Step 310, the feature set is processed to generate a predicted rank for the node for a subsequent time window using a machine learning model. In one embodiment, the predicted rank predicts a rank calculated with a ranking algorithm that uses a count of edges of the node of the graph. For example, the ranking algorithm may use a count of the number of transactions, a sum of the values of the transactions, etc., to determine the rank of a node. Predicted ranks may be predicted for each node of each graph of the time windows being analyzed. Time windows are analyzed that fill a time period. For example, a time window may be a day's worth of transactions and a time period may be a week or a month's worth of transactions. In one embodiment, the machine learning model comprises one or more of a recurrent neural network, a long short term memory (LSTM), a gated recurrent unit (GRU), a transformer neural network.

At Step 312, the predicted rank is processed to select an entity identifier corresponding to the node. In one embodiment, the predicted ranks are processed to order, group, or cluster the entities corresponding to the nodes of the graphs. In one embodiment, a first group may be formed from the entities corresponding to nodes with the ten highest predicted ranks, a second group may be formed from the entities corresponding to nodes with the hundred highest predicted ranks, and a third group may be formed from the entities corresponding to nodes with the thousand highest predicted ranks. The entity identifier for the entity corresponding to the highest entity rank may be selected for further processing.

At Step 315, the entity identifier is presented. The entity identifier may be presented by transmitting the entity identifier to a user device that displays the entity identifier.

In one embodiment, the entity identifier may be presented as part of a message. The message may be transmitted to and displayed by a user device. The content of the message is based on the predicted rank. For example, when the predicted rank of the selected entity identifier is within the first group of the ten highest predicted ranks, the message may be in an email with a link that provides immediate access to use a product or service. When in a second group of the hundred highest predicted ranks, the message may be an email with a link that provides access to use a product or service after registering. When in a third group of the thousand highest projected ranks, the message may be an email with a link to a website that advertises a product or service. Different embodiments may have the message sent using physical mail, a phone call, electronic messaging, etc.

In one embodiment, the machine learning model is trained to generate the predicted rank for the subsequent time window from the feature set for the time window by calculating calculated ranks and updating the machine learning model. Multiple calculated ranks, for a plurality of time windows, may be calculated from multiple graphs for multiple time windows. The machine learning model may be updated using comparisons of model outputs (e.g., prediction data generated by the machine learning model during training) to the calculated ranks.

In one embodiment, the transaction data for a transaction type is processed to generate the graph for the transaction type and generate the predicted rank for the transaction type. Graphs may be generated for different transaction types. A predicted rank may be generated for each node of the graphs of the different transaction types.

In one embodiment, a rank of a node of the graph is calculated with a rank algorithm. The ranking algorithm uses a count of edges of the node of the graph.

In one embodiment, the entity identifier is selected by sorting predicted ranks. The predicted ranks may be sorted into a list that is included in a message presented to a user device.

In one embodiment, a request is transmitted. The request may be transmitted from a user device. The request may trigger an application programming interface call to transmit a response that includes a sorted list of entities based on the predicted ranks for the entities.

A response to the request may be received and displayed. The response may include a sorted list of entity identifiers, which identify the entities.

FIGS. 4A through 4D illustrate examples of implementing an influencer segmentation detector. Different embodiments may use different implementations.

Figure 4A:
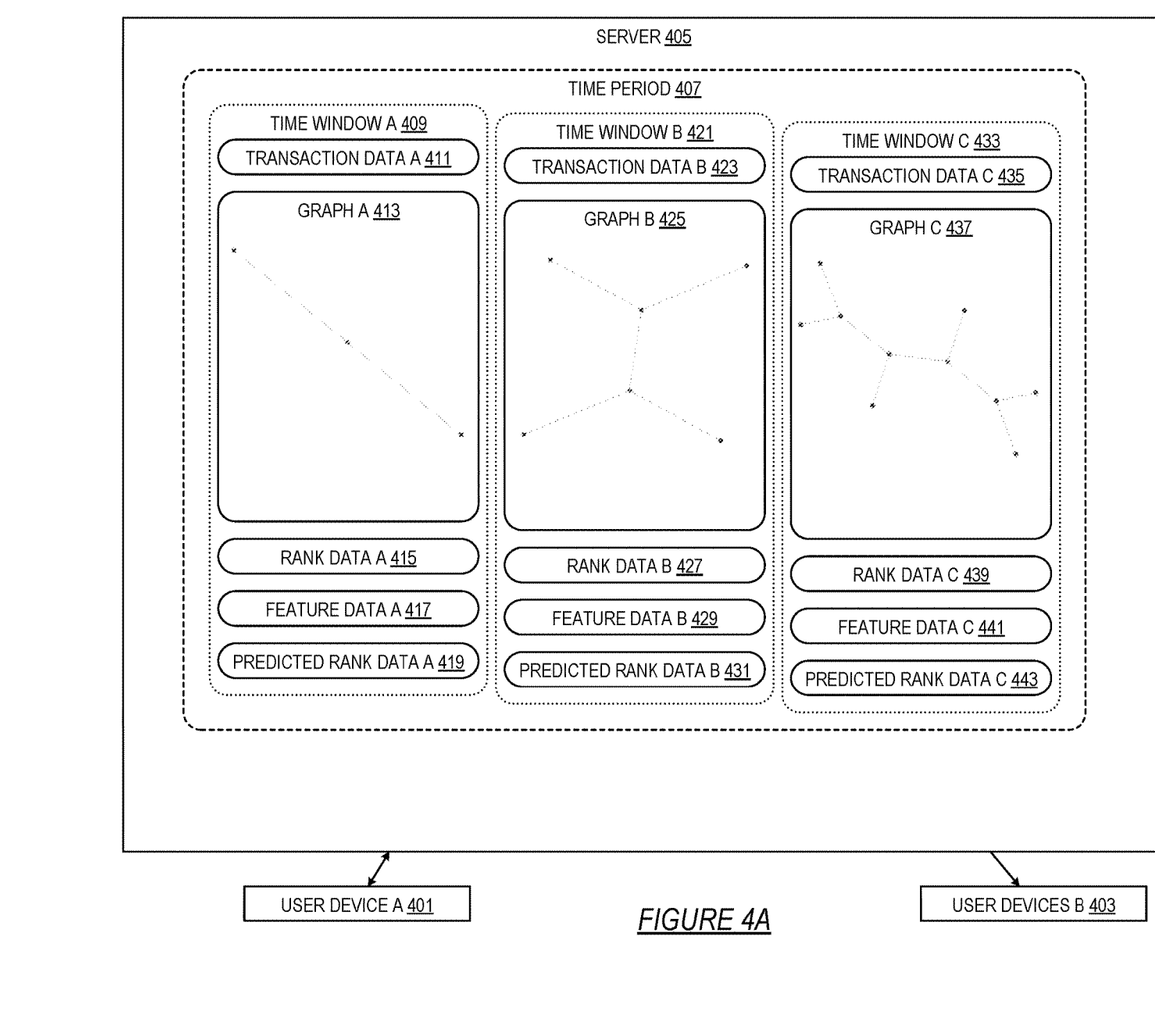
FIG. 4A, FIG. 4B, FIG. 4C, and FIG. 4D show examples in accordance with disclosed embodiments.

Turning to FIG. 4A, Bob operates the user device A (401) and wants to view a list of influencers sorted by their level of influence. Alice, Joe, and Bizco are three entities (influencers) that operate the user devices B (403). The entities Alice, Joe, and Bizco are represented as nodes in the graphs A (413), B (425), and C (437). The edges in the graphs A (413), B (425), and C (437) represent aggregations of the transactions between the entities represented by the nodes of the graphs A (413), B (425), and C (437).

The server (405) processes transaction data (including the transaction data A (411), B (423), and C (435)) to generate predicted rank data (including the predicted rank data A (419), B (431), and C (443)) to identify the level of influence of the entities Alice, Joe, and Bizco. For the time window A (409) of the time period (407), the server (405) selects the transaction data A (411). The transaction data A (411) is processed to generate the graph A (413). The graph A (413) is processed to generate the rank data A (415) and the feature data A (417). The feature data A (417) is processed to generate the predicted rank data A (419).

For the time window B (421) of the time period (407), the predicted rank data B (431) is generated from the feature data B (429), the feature data B (429) and the rank data B (427) are generated from the graph B (425), the graph B (425) is generated from the transaction data B (423), and the transaction data B (423) is selected for the time window B (421). For the time window C (433) (of the time period (407)), the predicted rank data C (443) is generated from the feature data C (441), the feature data C (441) and the rank data C (439) are generated from the graph C (437), the graph C (437) is generated from the transaction data C (435), and the transaction data C (435) is selected for the time window C (433).

The predicted rank data A (419) of the time window A (409) predicts the rank data B (427) of the time window B (421). The predicted rank data B (431) of the time window B (421) predicts the rank data C (439) of the time window C (433).

Figure 4B:
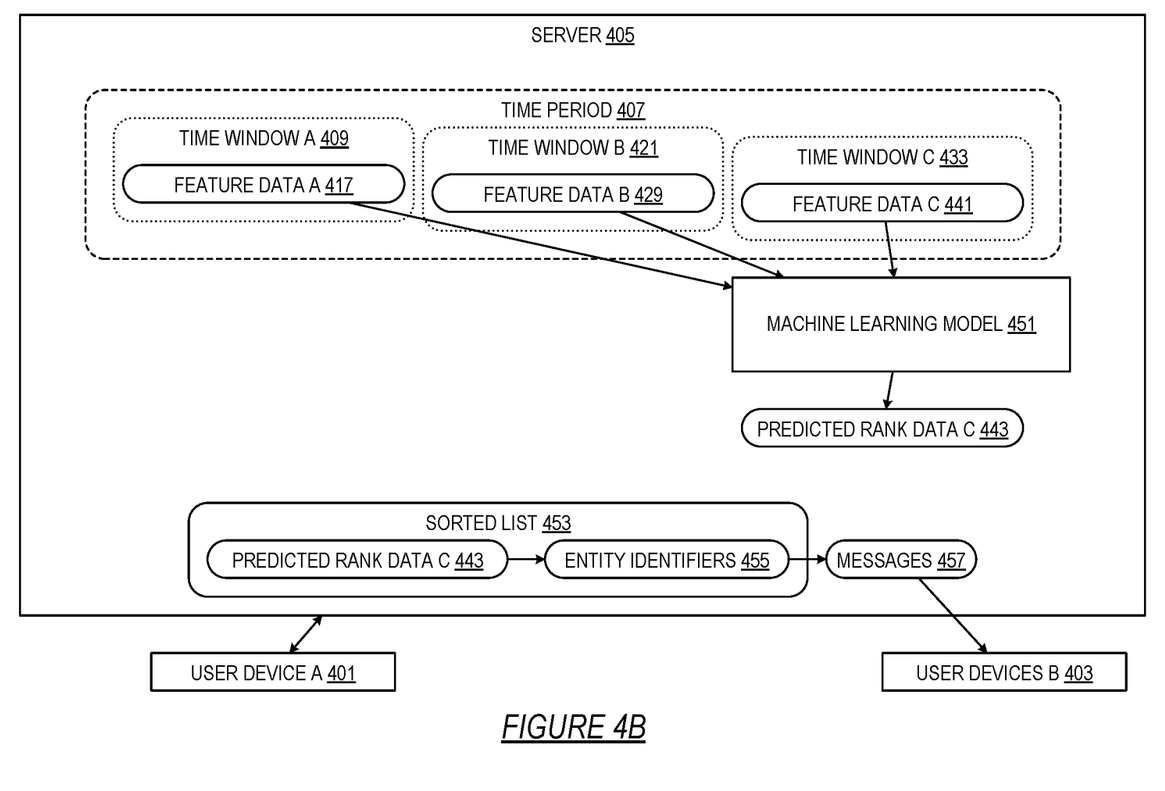

Turning to FIG. 4B, the feature data A (417), B (429), and C (441) (respectively of the time windows A (409), B (421), and C (433) of the time period (407)) are input to the machine learning model (451) (e.g., a recurrent neural network) to generate the predicted rank data C (443). The predicted rank data C (443) predicts the rank data for a subsequent time window and is used to identify the level of influence of Alice, Joe, and Bizco. The predicted rank data C (443) is processed to generate the sorted list (453).

The sorted list (453) includes the predicted rank data C (443) and the entity identifiers (455). The predicted rank data C (443) is mapped to the entity identifiers (455). The entity identifiers (455) identify Alice, Joe, and Bizco.

In response to a request from the user device A (401) by Bob, the sorted list (453) is presented to the user device A (401). The sorted list (453) is presented by transmitting the sorted list (453) to the user device A (401), which displays the sorted list (453). Upon viewing the sorted list (453), Bob can see the levels of influence for Alice, Joe, and Bizco.

The predicted rank data C (443) and the entity identifiers (455) are also processed to generate the messages (457). The messages (457) are presented to the user devices B (403) by transmitting one of the messages (457) to each of the user devices B (403).

Figure 4C:
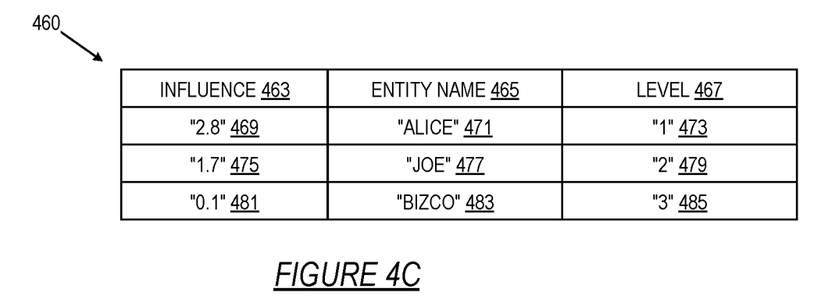

Turning to FIG. 4C, the sorted list (453) of FIG. 4B is displayed as the table (460) to Bob through the user device A (401) of FIG. 4B.

The table (460) includes multiple columns and rows. The rows of the table display information for the entities identified in the column labeled "entity name" (465).

Data in the column labeled "influence" (463) displays the predicted rank data C (443) (of FIG. 4B) for the entities identified in the column labeled "entity name" (465). Data in the column labeled "entity name" (465) displays the names of the entities. The names of the entities are identified from the entity identifiers (455) from the sorted list (453) of FIG. 4B. Data in the column labeled "level" (467) displays the level of influence for the entities identified in the column labeled "entity name" (465).

Alice (identified with the entity name "Alice" (471)) is a level "1" influencer with her influence ("2.8" (469)) being above the level "1" threshold of "2.0". Joe (identified with the entity name "Joe" (477)) is a level "2" influencer with his influence ("1.7" (475)) being below the level "1" threshold of "2.0" and above the level "2" threshold of "1.0". Bizco (identified with the entity name "Bizco" (483)) is a level "3" influencer with its influence ("0.1" (481)) being below the level "2" threshold of "1.0". In one embodiment, the thresholds may correspond to a standard deviation. For example, the level "1" threshold may be one standard deviation above the mean of the predicted ranks of the entities and the level "2" threshold may be one standard deviation below the mean of the predicted ranks of the entities.

Figure 4D:
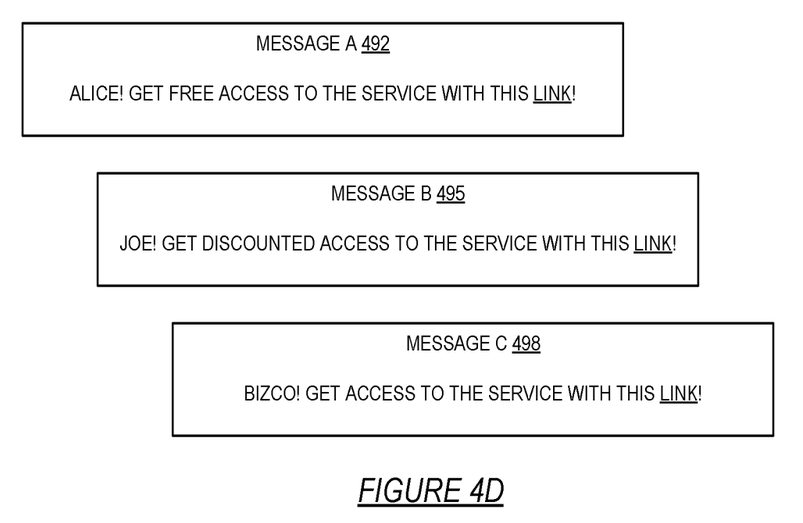

Turning to FIG. 4D, the messages A (492), B (495), and C (498) (of the messages (457) of FIG. 4B) are transmitted to the user devices B (403) (of FIG. 4B). The content of the messages A (492), B (495), and C (498) is based on the predicted rank data C (443) (of FIG. 4B). The messages A (492), B (495), and C (498) provide different levels of access to increase the probability that influencers with higher levels of influence (e.g., Alice has a higher level of influence compared to Joe, who has a higher level of influence compared to Bizco) will access the service.

The message A (492) corresponds to influence level "1". The message A (492) informs Alice that she has been given free access to a service accessible by a link in the message A (492). The message B (495) corresponds to influence level "2". The message B (495) informs Joe that he has been given discounted access to a service accessible by a link in the message B (495). The message C (498) corresponds to influence level "3". The message C (498) informs Bizco that it may access the service by a link in the message C (498), which is not free and is not discounted.

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and 508)) may be locally or remotely connected to the computer processor(s) (502), non-persistent storage (504), and persistent storage (506). Many different types of computing systems exist, and the aforementioned input and output device(s) (510 and 508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
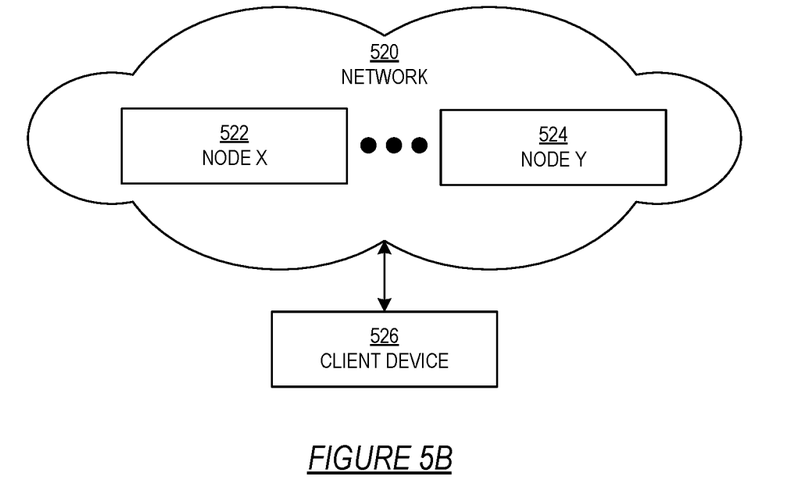

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
selecting transaction data for a time window;
processing the transaction data for the time window to generate a plurality of graphs based on transaction type for the time window, the plurality of graphs comprising a plurality of nodes and a plurality of edges connecting the plurality of nodes;
for each node in the plurality of nodes:
extracting, from the graph plurality of graphs, a feature set for the each node for the time window;
processing the feature set, extracted for the each node for the time window from the transaction data, to generate a predicted rank for the each node for a subsequent time window using a machine learning model and based at least in part on each edge in the plurality of edges connected to the each node; and
selecting, using the predicted rank, an entity identifier corresponding to the node;
selecting the entity identifier by sorting the plurality of nodes based on the predicted ranks for the subsequent time window for the plurality of nodes into a sorted list;
selecting an entity identifier from the sorted list;
transmitting a message using the entity identifier by sending an email with a link; and
presenting the entity identifier.

2. The method of claim 1,
wherein content of the message is based on the predicted rank, wherein the entity identifier is part of a list of entities sorted by a plurality of influence levels determined from the predicted rank and a plurality of influence level thresholds.

3. The method of claim 1, further comprising:
training the machine learning model to generate the predicted rank for the subsequent time window from the feature set for the time window by:
calculating a plurality of calculated ranks, for a plurality of time windows, from a plurality of additional graphs for the plurality of time windows; and
updating the machine learning model using comparisons of a plurality of model outputs to the plurality of calculated ranks.

4. The method of claim 1, further comprising:
processing the transaction data for a transaction type to generate the plurality of graphs and generate the predicted rank for the transaction type.

5. The method of claim 1, further comprising:
processing the feature set by the machine learning model, wherein the machine learning model comprises one or more of a recurrent neural network, a long short term memory (LSTM), a gated recurrent unit (GRU), and a transformer neural network.

6. The method of claim 1, further comprising:
calculating a rank of the each node of the plurality of graphs with a rank algorithm that uses a count of edges of the each node.

7. The method of claim 1, further comprising:
extracting the feature set comprising one or more attribute features and topological features.

8. A system comprising:
a graph controller configured to generate a graph;
an extraction controller configured to extract a feature set;
a machine learning model configured to generate a predicted rank;
a selection controller configured to select an entity identifier; and
an application executing on one or more servers and configured for:
selecting transaction data for a time window;
processing, by the graph controller, the transaction data for the time window to generate a plurality of graphs based on transaction type for the time window, the plurality of graphs comprising a plurality of nodes and a plurality of edges connecting the plurality of nodes;
for each node in the plurality of nodes:
extracting, by the extraction controller from the plurality of graphs, a feature set for the each node for the time window;
processing, by the machine learning model, the feature set, extracted for the each node for the time window from the transaction data, to generate the predicted rank for the each node for a subsequent time window and based at least in part on each edge in the plurality of edges connected to the each node; and
selecting, by the selection controller using the predicted rank, an entity identifier corresponding to the node;
sorting the plurality of nodes based on the predicted ranks for the subsequent time window for the plurality of nodes into a sorted list;
selecting, by the selection controller, the entity identifier from the sorted list; and
transmitting a message using the entity identifier by sending an email with a link; and
presenting the entity identifier.

9. The system of claim 8,
wherein content of the message is based on the predicted rank, wherein the entity identifier is part of a list of entities sorted by a plurality of influence levels determined from the predicted rank and a plurality of influence level thresholds.

10. The system of claim 8, wherein the application is further configured for:
training the machine learning model to generate the predicted rank for the subsequent time window from the feature set for the time window by:
calculating a plurality of calculated ranks, for a plurality of time windows, from a plurality of additional graphs for the plurality of time windows; and
updating the machine learning model using comparisons of a plurality of model outputs to the plurality of calculated ranks.

11. The system of claim 8, wherein the application is further configured for:
processing the transaction data for a transaction type to generate the plurality of graphs and generate the predicted rank for the transaction type.

12. The system of claim 8, wherein the application is further configured for:
processing the feature set by the machine learning model, wherein the machine learning model comprises one or more of a recurrent neural network, a long short term memory (LSTM), a gated recurrent unit (GRU), and a transformer neural network.

13. The system of claim 8, wherein the application is further configured for:
   calculating a rank of the each node of the plurality of graphs with a rank algorithm that uses a count of edges of the each node of the graph.

14. The system of claim 8, wherein the application is further configured for:
   extracting the feature set comprising one or more attribute features and topological features.

* * * * *